(12) United States Patent
Xu

(10) Patent No.: US 12,056,091 B2
(45) Date of Patent: Aug. 6, 2024

(54) POINT CLOUD DATA ENCAPSULATION METHOD AND POINT CLOUD DATA TRANSMISSION METHOD

(71) Applicant: SHANGHAI JIAO TONG UNIVERSITY, Shanghai (CN)

(72) Inventor: Yiling Xu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 5 days.

(21) Appl. No.: 17/791,599

(22) PCT Filed: Jan. 8, 2021

(86) PCT No.: PCT/CN2021/070917
§ 371 (c)(1),
(2) Date: Jul. 8, 2022

(87) PCT Pub. No.: WO2021/139784
PCT Pub. Date: Jul. 15, 2021

(65) Prior Publication Data
US 2023/0048715 A1 Feb. 16, 2023

(30) Foreign Application Priority Data
Jan. 10, 2020 (CN) .......................... 202010026089.4

(51) Int. Cl.
*G06F 16/17* (2019.01)
*G06F 16/174* (2019.01)
*G06F 16/182* (2019.01)

(52) U.S. Cl.
CPC ........ *G06F 16/1744* (2019.01); *G06F 16/182* (2019.01)

(58) Field of Classification Search
CPC .... G06F 16/1744; G06F 16/182; G06F 16/45; G06T 9/001; G06T 9/00; H04N 19/597;
(Continued)

(56) References Cited

U.S. PATENT DOCUMENTS 10,735,826 B2 * 8/2020 Ruhm ................ H04N 21/6587
10,764,911 B2 * 9/2020 Ramesh ................ G06F 9/5072
(Continued)

FOREIGN PATENT DOCUMENTS

CN 101017476 A 8/2007
CN 106331676 A 1/2017
(Continued)

OTHER PUBLICATIONS

Search Report for the Chinese Application No. 2020100260894, dated Jan. 10, 2020, 2 pages.
(Continued)

*Primary Examiner* — Hicham Skhoun
(74) *Attorney, Agent, or Firm* — KDW Firm PLLC

(57) ABSTRACT

Provided are a point cloud data encapsulation method and a point cloud data transmission method. The point cloud data encapsulation method includes: compressing a point cloud media file; and encapsulating the compressed point cloud media file and setting a classification record according to a data type, where the classification record is used for indicating a data type of each portion of point cloud data in the point cloud media file. The problem of low transmission efficiency of the media content and waste of storage space in the point cloud data transmission is solved, the flexibility of the media content combination is increased, management control of a multimedia service is increased, users are given more rights to independently select and acquire the media content, diversified application scenarios are provided, and better multimedia content provision and transmission solutions are provided for network operators.

12 Claims, 3 Drawing Sheets

(58) Field of Classification Search
CPC ......... H04N 21/2343; H04N 21/23608; H04N 21/816; H04N 21/8456; H04N 21/23605; H04L 65/70; H04L 65/61; H04L 69/04; H04L 67/06

See application file for complete search history.

(56) References Cited

U.S. PATENT DOCUMENTS

| | | | | |
|---|---|---|---|---|
| 10,783,668 | B2* | 9/2020 | Sinharoy | G06T 7/55 |
| 10,911,572 | B2* | 2/2021 | Heiser | H04L 67/34 |
| 11,170,556 | B2* | 11/2021 | Oh | G06T 15/04 |
| 11,200,700 | B2* | 12/2021 | Wang | G06T 9/00 |
| 11,200,701 | B2* | 12/2021 | Aksu | G06T 9/001 |
| 11,259,048 | B2* | 2/2022 | Budagavi | G06T 9/001 |
| 11,348,284 | B2* | 5/2022 | Tourapis | H04N 19/88 |
| 11,361,472 | B2* | 6/2022 | Lasserre | H03M 7/3059 |
| 11,381,621 | B2* | 7/2022 | Yip | H04L 65/75 |
| 11,449,771 | B2* | 9/2022 | Petousis | H03M 7/3073 |
| 11,570,481 | B2* | 1/2023 | Flynn | H04N 19/91 |
| 11,589,032 | B2* | 2/2023 | Wang | G11B 27/322 |
| 11,627,314 | B2* | 4/2023 | Tourapis | H04N 19/597 375/240.18 |
| 2018/0041820 | A1* | 2/2018 | Xu | H04N 21/8549 |
| 2018/0053324 | A1 | 2/2018 | Cohen et al. | |
| 2021/0029187 | A1* | 1/2021 | Oh | H04L 65/61 |
| 2021/0099754 | A1* | 4/2021 | Yip | H04N 21/816 |
| 2021/0209806 | A1* | 7/2021 | Oh | H04N 13/194 |
| 2021/0211724 | A1* | 7/2021 | Kim | H04N 19/30 |

FOREIGN PATENT DOCUMENTS

| | | |
|---|---|---|
| CN | 107426559 A | 12/2017 |
| CN | 108009979 A | 5/2018 |
| CN | 108510558 A | 9/2018 |
| CN | 110012279 A | 7/2019 |
| CN | 110363822 A | 10/2019 |

OTHER PUBLICATIONS

Office Action for the Chinese Application No. 2020100260894, dated Nov. 3, 2021, 16 pages.

S. Schwarz et al., "Emerging MPEG Standards for Point Cloud Compression," in IEEE Journal on Emerging and Selected Topics in Circuits and Systems, vol. 9, No. 1, pp. 133-148, Mar. 2019, DOI: 10.1109/JETCAS.2018.2885981.

Jang et al., "Video-Based Point-Cloud Compression Standard in MPEG: From Evidence Collection to Committee Draft" IEEE Signal Processing Magazine, May 2019, 6 pages.

International Search Report for the International Patent Application No. PCT/CN2021/070917, mailed Apr. 9, 2021, 4 pages.

Yip, Eric et al, "Encapsulation and Signalling of V-PCC data in MMT," International Organisation For Standardisation, ISO/IEC JTC1/SC29/WG11 Coding of Moving Pictures and Audio, Oct. 2019.

Xu, Yiling et al, "Idea of Sigalling of V-PCC Data in MMT," International Organisation For Standardisation ISO/IEC JTC1/SC29/WG11-Coding of Moving Pictures and Audio, Jan. 2020.

European Search Report for U.S. Appl. No. 21/738,215 dated Jan. 3, 2024.

\* cited by examiner

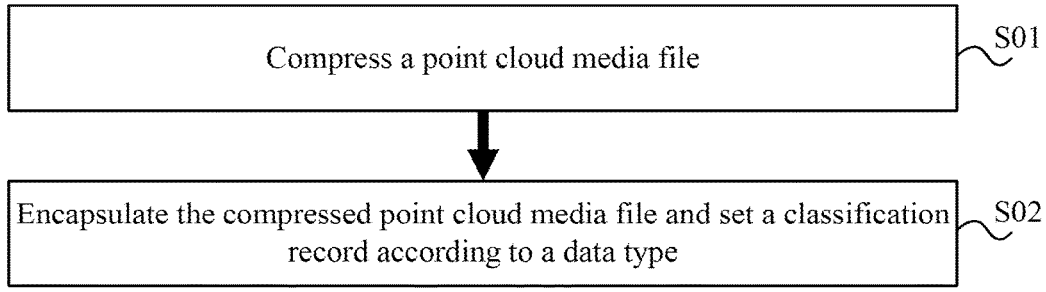
FIG. 1
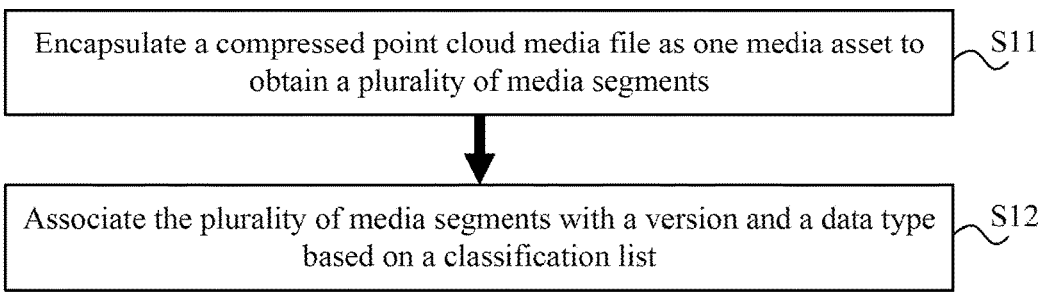
FIG. 2
FIG. 3

POINT CLOUD DATA ENCAPSULATION METHOD AND POINT CLOUD DATA TRANSMISSION METHOD

CROSS REFERENCE TO RELATED APPLICATION

This is a national stage application filed under 37 U.S.C. 371 based on International Patent Application No. PCT/CN2021/070917, filed on Jan. 8, 2021, which is based on and claims priority to a Chinese Patent Application No. 202010026089.4 filed on Jan. 10, 2020, disclosures of which are incorporated herein by reference in their entireties.

TECHNICAL FIELD

The present disclosure relates to the field of multimedia transmission technologies and, in particular, to a point cloud data encapsulation method and a point cloud data transmission method.

BACKGROUND

In recent years, with the rapid development and improvement of media transmission technology, the lowering cost of transmitting image and video information, and the improving accuracy of image and video information, the maturity of relevant application fields is promoted. Three-dimensional point cloud data, as a new type of image media data, can provide more accurate and vivid image information for users and bring a more realistic and interactive communication experience.

The point cloud data is the object surface information obtained by scanning, including three-dimensional coordinate data, depth information, color information and the like. With the maturity of three-dimensional (3D) scanning technology and the perfection of system architecture, the accuracy of point cloud data is improved, and the amount of point cloud data is greatly improved. For static point cloud data, dynamic point cloud data, point cloud data of machine perception, point cloud data of human eye perception and other different types of point cloud data, there are different point cloud data compression algorithms. For example, for dynamic point cloud data of human eye perception, the typical point cloud compression algorithms is to convert 3D point cloud data into two-dimensional (2D) image data and then process the data, and one of the typical point cloud compression algorithm is the video-based point cloud compression (VPCC) algorithm. In such a compression method, 3D point cloud is firstly projected onto a 2D plane to obtain occupation graph information, geometric information, attribute information and auxiliary information, where the attribute information usually includes texture information and color information. Therefore, the compressed information is usually divided into four types of data for transmission.

Therefore, when the VPCC data is about to be transmitted, the to-be-processed information mainly includes four types of data, that is, geometric information, attribute information, occupation graph information and auxiliary information. The decoding of the geometric information depends on the occupation graph information and the auxiliary information, and the decoding of the attribute information depends on the geometric information, the occupation graph and the auxiliary information. It can be seen that the point cloud media data is more complex and multivariate than the conventional media data, and different types of data need to be processed synchronously and integrated, and then the media having rich spatial characteristics and texture characteristics is presented to users. At present, the research on encapsulation and transmission of 3D point cloud data using existing multimedia transmission protocols has made some progress. However, with the development of network transmission technology, the heterogeneous network environment becomes increasingly complex, and the transmission effect of point cloud data in the heterogeneous network environment is poor in the existing art.

SUMMARY

In view of the defects in the existing art, the object of the present disclosure is to provide a point cloud data encapsulation method and a point cloud data transmission method.

The point cloud data encapsulation method provided by the present disclosure includes the steps described below.

A point cloud media file is compressed.

The compressed point cloud media file is encapsulated and a classification record is set according to a data type, where the classification record is used for indicating a data type of each portion of point cloud data in the point cloud media file.

Optionally, in a case where the point cloud media file includes a plurality of point cloud contents, a pending flag is set in the encapsulated point cloud media file, where the pending flag is used for indicating whether media assets of all data types in each point cloud content have been transmitted.

Optionally, the classification record is a classification list, and the classification list indicates the correspondence between the media segment, the media version and the data type.

The step where the compressed point cloud media file is encapsulated and the classification record is set according to the data type includes the steps described below.

The compressed point cloud media file is encapsulated to obtain one media asset which includes a plurality of media segments.

The plurality of media segments is associated with the media version and the data type based on the classification list.

Optionally, the plurality of media assets has different media asset numbers; the classification list includes a type list, a content list and a segment number list; the type list corresponds to a data type of a point cloud media file; the content list is a set of a plurality of media versions; the segment number list is a set of all media segment numbers; each data type corresponds to at least one media version, and each media version corresponds to at least one media segment number.

Optionally, the classification record is a classification flag, and the classification flag represents the correspondence between the media segment and the media version and the data type.

The step where the compressed point cloud media file is encapsulated and the classification record is set according to the data type includes the steps described below.

The compressed point cloud media file is encapsulated to obtain one media asset, where the media asset includes a plurality of media segments.

One classification flag is added to each media segment.

Optionally, when different media segments have the same media version and the same data type, the added classification flags are the same.

Optionally, the classification flag includes two flag bits; one flag bit is used for defining the data type of a media segment, and the other flag bit is used for defining the version of the media segment.

Optionally, the classification record is a classification list, and the classification list represents the correspondence between the media asset and the data type.

The step where the compressed point cloud media file is encapsulated and the classification record is set according to the data type includes the steps described below.

The compressed point cloud media file is encapsulated to obtain a plurality of media assets.

The plurality of media assets is associated with the data type based on the classification list.

Optionally, the plurality of media assets has different media asset numbers; the classification list includes a media asset list and an asset number list; the media asset list corresponds to a data type of the point cloud media file; the asset number list is a set of all media asset numbers; each media asset list corresponds to at least one media asset number, and the quantity of media asset numbers corresponding to each media asset list is consistent with the number of media versions.

The point cloud data transmission method provided by the present disclosure includes the steps described below.

The related content of a classification record is added to signaling information, where the classification record is used for indicating a data type of each portion of point cloud data in a point cloud media file when the point cloud media file is encapsulated.

The classification record is acquired according to the signaling information, and local data that needs to be updated in the current point cloud media file is transmitted according to the classification record.

Before the local data that needs to be updated in the point cloud media file is transmitted, the method further includes the following step: all data of the point cloud media file is transmitted.

Optionally, in a case where the point cloud media file includes a plurality of point cloud contents, a pending flag is set in the encapsulated point cloud media file, where the pending flag is used for indicating whether media assets of all data types in each point cloud content have been transmitted.

Optionally, the compressed point cloud media file is encapsulated and a classification record is set according to a data type, where the classification record is a classification list, and the classification list indicates the correspondence between the media asset and the data type.

Optionally, the step where the compressed point cloud media file is encapsulated and the classification record is set according to the data type includes the steps described below.

The compressed point cloud media file is encapsulated as a group of media assets to obtain a plurality of media assets.

The plurality of media assets is associated with a data type based on the classification list.

Optionally, the plurality of media assets has different media asset numbers; the classification list includes a media asset list and an asset number list; the media asset list corresponds to a data type of a point cloud media file; the asset number list is a set of all media asset numbers; each media asset list corresponds to at least one media asset number, and the quantity of media asset numbers corresponding to each media asset list is consistent with the number of media versions.

Optionally, the classification record is a classification list, and the classification list represents the correspondence between the media segment and the media version and the data type.

The step where the related content of the classification record is added to the signaling information includes the step described below.

The classification list is defined as a data type group (DTG) information file, and the DTG information file is written into the signaling information.

Optionally, the DTG information file is written into a media presentation information (MPI) table, or a descriptive descriptor is added to describe the DTG information file, or a signaling table is added to describe the DTG information file.

Optionally, the classification record is a classification list, and the classification list represents the correspondence between the media asset and the data type.

The step where the related content of the classification record is added to the signaling information includes the step described below.

The classification list is defined as an asset content relationship (ACR) information file, and the ACR information file is written into the signaling information.

Optionally, the ACR information file is written into an MPI table or a descriptive descriptor is added to describe the ACR information file or a signaling table is added to describe the ACR information file.

Optionally, the classification record is a classification flag, and the classification flag represents the correspondence between the media segment and the media version and the data type.

The step where the related content of the classification record is added to the signaling information includes the step described below.

One classification flag is defined for each media segment using a reserved field.

Optionally, the classification flag includes two flag bits; one flag bit is used for defining the data type of a media segment, and the other flag bit is used for defining the version of the media segment; when the version of the media segment is 1, the media segment has only the flag bit that is used for defining the data type of the media segment.

Optionally, one flag bit is defined using 2 bits of a reserved field in a media processing unit (MPU) Box to represent the data type of the media segment, and the other flag bit is defined using 3 bits of the reserved field in the MPU Box to represent the version of the media segment.

Compared with the existing art, the present disclosure has the following beneficial effects.

In the present disclosure, based on the existing point cloud data processing method, the classification record is set for the point cloud media file according to the data type so that different data of the point cloud data can be easily identified according to the classification record. In this manner, the local data of the point cloud data can be flexibly sent according to the application requirements, and not all the point cloud data needs to be sent. Therefore, the bandwidth is saved while the application requirements are satisfied, the point cloud data can be more flexible and efficiently transmitted, and the flexible transmission of the point cloud data in the heterogeneous network is achieved. Therefore, the present disclosure solves the problem of low transmission efficiency of the media content and waste of storage space in the point cloud data transmission, increases the flexibility of the media content combination, increases management control of a multimedia service, gives users more rights to independently select and acquire the media content, provides diversified application scenarios, and provides better multimedia content provision and transmission solutions for network operators.

BRIEF DESCRIPTION OF DRAWINGS

Other features, objects and advantages of the present disclosure will become more apparent from the detailed description of non-limiting embodiments with reference to the drawings below.

FIG. 1 is a flowchart of the encapsulation of point cloud data according to an embodiment of the present disclosure;

FIG. 2 is a flowchart of the encapsulation of point cloud data according to embodiment one of the present disclosure;

FIG. 3 shows the definition content of a DTG information file according to embodiment one of the present disclosure;

DETAILED DESCRIPTION

Figure 4:
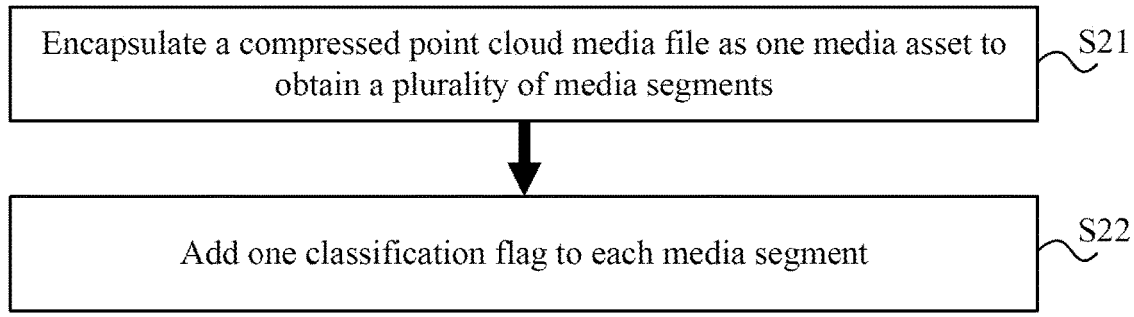
FIG. 4 is a flowchart of the encapsulation of point cloud data according to embodiment two of the present disclosure.

The present disclosure will be described below in detail in conjunction with specific embodiments. The following embodiments are provided for ease of understanding of the present disclosure by those skilled in the art but are not intended to limit the present disclosure in any manner. It is to be noted that those of ordinary skill in the art can make a number of variations and improvements without departing from the concept of the present disclosure, and such variations and improvements are within the scope of the present disclosure.

The inventor of the present application found that the point cloud media content may have the interaction with the user during the presentation of the point cloud media content, and some information of the point cloud is required to be changed. For example, in a point cloud media-based character dressing operation, attribute information such as the texture and color of the point cloud is usually required to be changed. At this point, in the conventional technology, all the point cloud data is usually sent to the client, and this operation increases the bandwidth, has low transmission efficiency and affects the user experience.

In view of the problems described above, the present disclosure provides a point cloud data encapsulation method, and as shown in FIG. 1, the method includes the steps S01 and S02.

In step S01, a point cloud media file is compressed.

In S02, the compressed point cloud media file is encapsulated and a classification record is set according to a data type. The classification record is used for indicating a data type of each portion of point cloud data in the point cloud media file.

The present disclosure sets the classification record so that different data of the point cloud data is identified according to the classification record when the point cloud content is presented, thereby achieving the self-adaptive transmission and presentation of the point cloud data.

Furthermore, based on the point cloud data encapsulation method of the present disclosure, the present disclosure also provides a point cloud data transmission method, and the method includes the steps described below.

A related content of the classification record described above is added to signaling information.

The classification record is acquired according to the signaling information, and local data that needs to be updated in the current point cloud media file is transmitted according to the classification record. Before the local data that needs to be updated in the current point cloud media file is transmitted, the method further includes the following step: all data of the current point cloud media file is transmitted.

Based on the encapsulation method and the transmission method described above, when the point cloud content is presented for the first time, complete point cloud data is required to be acquired to present the point cloud content. After the point cloud content is presented, if only dressing and other operations need to be performed, the data that needs to be updated in the current point cloud media file may be selectively transmitted according to the classification record, and not all information needs to be transmitted.

The object, features and advantages of the present disclosure will be more apparent from the detailed description of the embodiments of the present disclosure in conjunction with the drawings.

Embodiment One

In this embodiment, the classification record is made through a classification list. The classification list represents the correspondence between the media segment in the point cloud media file and the media version and the data type. More specifically, the compressed point cloud media file is encapsulated as one media asset and may be segmented to obtain a plurality of media segments, for example, 16 media segments shown in FIG. 3. Each media segment has one media segment number, such as media segment numbers 1 to 16, sequentially numbered. It can be seen that each media segment number is different, that is, the media segment is represented by the media segment number.

FIG. 2 is a flowchart of the encapsulation of point cloud data according to this embodiment. As shown in FIG. 2, after the compressed point cloud media file is obtained, the method further includes the steps S11 and S12.

In step S11, the compressed point cloud media file is encapsulated as one media asset to obtain a plurality of media segments.

In step S12, the plurality of media segments is associated with the version and the data type based on the classification list. The "being associated" refers to the establishment of the correspondence between the data type and the media version and the media segment number, and the "being associated" below has the same definition.

FIG. 3 shows the definition content of the classification list according to this embodiment. As shown in FIG. 3, the classification list includes a type list, a content list and a segment number list. The type list corresponds to the data type of the point cloud media file. The content list is a set of a plurality of media versions. The segment number list is a set of all media segment numbers. Each data type corresponds to at least one media version, and each media version corresponds to at least one media segment number. In this embodiment, the number of type lists corresponds to the data type of the point cloud media file, and one media version is one application scenario.

With continued reference to FIG. 3, the following is described using the video-based point cloud compression algorithm (VPCC) as an example. After one point cloud media file is processed, four types of data may be obtained, that is, occupation graph information, geometric information, attribute information and auxiliary information. At this point, during encapsulation, the media asset is segmented into a plurality of media segments, and these media segments also include four types of data, that is, occupation graph information, geometric information, attribute information and auxiliary information. Assuming that one media asset is segmented into 16 media segments that are numbered 1 to 16 sequentially; the data type of each part of one point cloud media file is the set of media segments.

In an example embodiment, the four types of data described above are represented by type lists 1, 2, 3 and 4, respectively. The type list 1 represents the occupation map information; the type list 2 represents the geometric information; the type list 3 represents the attribute information; and the type list 4 represents the auxiliary information. It is further assumed that the occupation graph information includes two versions that are the content list 1 and the content list 2 respectively, the content list 1 is composed of media segments with media segment numbers 1 and 2, and the content list 2 is composed of media segments with media segment numbers 3, 4 and 5, that is, the occupation graph information is composed of media segments with media segment numbers 1, 2, 3, 4 and 5. It is assumed that geometric information includes only one version that is the content list 3, and the content list 3 is composed of media segments with media segment numbers 6 and 7, that is, the geometric information is composed of media segments with media segment numbers 6 and 7. It is further assumed that the attribute information includes two versions that are the content list 4 and the content list 5 respectively, the content list 4 is composed of media segments with media segment numbers of 8, 9 and 10, and the content list 5 is composed of media segments with media segment numbers of 11 and 12, that is, the attribute information is composed of media segments with media segment numbers of 8, 9, 10, 11 and 12. It is further assumed that the attribute information includes two versions that are the content list 6 and the content list 7 respectively, the content list 6 is composed of media segments with media segment numbers 13 and 14, and the content list 7 is composed of media segments with media segment numbers 15 and 16, that is, the attribute information is composed of media segments with media segment numbers 13, 14, 15 and 16. When one point cloud content is presented for the first time, four type lists need to be selected, one content list is selected from each type list, and then the point cloud content is completely presented by the media segments corresponding to the selected content lists. After the point cloud content is presented for the first time, if the character dressing and other operations need to be performed, media segments corresponding to a certain data type may be selectively transmitted according to the classification list, and not all media segments need to be transmitted.

It is to be noted that although this embodiment is described using the VPCC point cloud compression algorithm as an example, the point cloud compression algorithm is not limited in the present disclosure, and the point cloud data encapsulation method is not limited in the present disclosure. Therefore, the data type of the point cloud media file includes, but is not limited to, the four types exemplified herein, and if other compression algorithms are adopted, other numbers and/or types of data may be obtained.

Further, in order to transmit and present the point cloud content, the classification list is defined as a DTG information file, and the DTG information file is written into the signaling information for transmission. It is to be understood that the content defined by the DTG information file is the content defined by the type list so that the DTG information file is used for describing the correspondence between the point cloud media file and the media segment number, the correspondence between the point cloud media file and the content list, and the correspondence between the point cloud media file and the type list. In this manner, the receiving end can obtain the data classification of the point cloud media file by reading the DTG information file, and then can selectively send the data that needs to be updated in the current point cloud media file according to the demands of users.

The transmission manner of the DTG information file of this embodiment and the performance of the character dressing operation based on the point cloud media file will be described below in detail according to the above embodiments.

It is assumed that the point cloud content (that is, point cloud media file) includes occupancy map information, geometric information, attribute information and auxiliary information. If the occupancy map information, the geometric information, the attribute information and the auxiliary information have only one version, the number of type lists is the same as the number of content lists. However, in other cases, if the occupancy map information, the geometric information, the attribute information and the auxiliary information have only one version, the content list may not be set, but this operation will increase the complexity. If the occupancy map information, the geometric information, the attribute information and the auxiliary information all have a plurality of versions, at this point, the content list needs to be set.

For example, if the occupancy map information, the geometric information, the attribute information and the auxiliary information of the point cloud need to be transmitted, corresponding type lists need to be found. For example, in FIG. 3, type lists 1 to 4 correspond to the occupancy map information, the geometric information, the attribute information and the auxiliary information, respectively. Assuming that the occupancy map information includes two versions, there may be two content lists in the type list 1, and when a user selects one content list, the corresponding media segments may be obtained according to the media segment numbers listed in the content list for presenting the point cloud content.

Therefore, the DTG information file includes the information of the correspondence between the point cloud content and the media segment number, and the information may be transmitted using many methods, for example, a new signaling unit, signaling file or signaling message is defined or a new descriptor is added or header information of a transmission packet is added. According to the difference of implementation methods, the information described in the DTG information file may be transmitted and used in different manners.

For example, this embodiment provides three transmission manners for the transmission of the DTG information file, but the manner of adding the DTG information file to the signaling information includes, but is not limited to, the following manners.

In Manner one, a DTG information file for describing DTG information is added to the signaling information.

In Manner one, the DTG information file is written into the MPI table and transmitted as part of the signaling message, as shown in Table 1.

TABLE 1

Addition of the definition of the DTG Information file to the MPI table

| Grammar | Value | Bit width | Mnemonic |
|---|---|---|---|
| MPI_table ( ) { | | | |
|   table_id | | 8 | uimsbf |
|   version | | 8 | uimsbf |
|   length | N1 | 16 | uimsbf |
|   reserved | '1111' | 4 | bslbf |
|   PI_mode | | 2 | uimsbf |
|   reserved | '11' | 2 | bslbf |
|   MPIT_descriptors { | | | |
|     MPIT_descriptors_length | N2 | 16 | uimsbf |
|     for (i=0; i<N2; i++) { | | | |
|       MPIT_descriptors_byte | | 8 | uimsbf |
|     } | | | |
|   } | | | |
|   PI_content_count | N3 | 8 | uimsbf |
|   for (i =0; i<N3; i++) { | | | |
|     PI_content_type { | | | |
|       PI_content_type_length | N4 | 8 | uimsbf |
|       for (j=0; j<N4; j++) { | | | |
|         PI_content_type_length_byte | | 8 | uimsbf |
|       } | | | |
|     } | | | |
|     PI_content_name_length | N5 | 8 | uimsbf |
|     for (j=0; j<N5; j++) { | | | |
|       PI_content_name_byte | | 8 | uimsbf |
|     } | | | |
|     PI_content_descriptors { | | | |
|       PI_content_descriptors_length | N6 | 16 | uimsbf |
|       for (i=0; i<N6; i++) { | | | |
|         PI_contnent_descriptors_byte | | 8 | uimsbf |
|       } | | | |
|     } | | | |
|     PI_content_length | N7 | 16 | uimsbf |
|     for (j=0; j<N7; j++) { | | | |
|       PI_content_byte | | 8 | uimsbf |
|     } | | | |
|   } | | | |
| } | | | |

The DTG information file is added to the MPI table, the part that needs to be modified is the description part of the PI_content, and the value of PI_content_count is increased by I; where the PI_content_type field describes the type of DTG information file, and the file format suitable for describing the DTG information may be selected according to the actual situation; the value of PI_content_type_length is the length of the file type; the value of PI_content_type_length_byte is the type of the DTG information file; the value of PI_content_name_length is the length of the name of the DTG information file; the value PI_content_name_byte is the value of the name of the DTG information file; PI_content_descriptores_length and PI_content_descriptors_byte are the length and content of the description information of the DTG information file, respectively, and may be null at present for subsequent expansion; PI_content_length and PI_content_byte are the length and content of the DTG information file, respectively.

According to the above instructions, the DTG information file is written into the MPI table, and then the DTG information may be sent through the signaling information.

In Manner two, a descriptor for describing DTG information is added.

For example, some descriptive descriptors are defined in the signaling message defined by the existing multimedia transmission (MMT) protocol, and descriptors are the descriptive information in the signaling part of MMT and used for defining some fields or functions, such as dependency descriptor and MPU_timestamp_descriptor. Therefore, in Manner two, one new descriptor of describing the DTG information may be defined and may be used for describing the type information of the media segment. In the MP table, an asset_descriptors field exists, and the filed may be implemented by adding MPUtype_descriptor to asset_descriptors as needed, as shown in Table 2.

TABLE 2

Definition of MPUtype_descriptor

| Grammar | Value | Bit width | Mnemonic |
|---|---|---|---|
| MPUtype_descriptor( ) { | | | |
|   descriptor_tag | | 16 | uimsbf |
|   descriptor_length | | 16 | uimsbf |
|   num_mpu | N1 | 8 | uimsbf |
|   for ( i = 0 ; i < N1 ; i++ ) { | | | |
|     mpu_type( ) | | | |
|   } | | | |
| } | | | |

Descriptor_tag is used for indicating the type of the descriptor, descriptor_length is used for indicating the length of the descriptor, num_mpu is used for indicating the number of MPUs, and mpu_type ( ) is used for indicating the data type of the MPU.

In Manner three, a signaling table for describing DTG information is added.

In addition to the manners described above, one new signaling table may be added to the signaling information to specifically describe the DTG file information. After a table describing the DTG file information is generated and a specific header is added, signaling information describing DTG information may be generated. The signaling information, together with a PA message, an MPI message, an MP message and a CRI message, constitutes new signaling information and is then transmitted. After the new signaling information is received, the receiving end may parse the new signaling information to obtain the content list information.

In an example operation, when the user requests the occupancy map information of the point cloud, the receiving end finds out the content list 1 corresponding to the occupancy map information by checking the DTG information file and finds out the media segment numbers 1 and 2 corresponding to the content list 1, and at this point, the client (point cloud media player) requests to send these media segments, store these media segments locally and update the local database. When the user then requests the geometric information of the point cloud, the receiving end also finds out the content list 3 corresponding to the geometric information by checking the DTG information file and finds out the media segment numbers 6 and 7 corresponding to the content list 3, and at this time, the client requests to send these media segments, store these media segments locally and updates the local database. When the user then requests the attribute information of the point cloud, the receiving end finds out the content list 4 corresponding to the attribute information by checking the DTG information file and finds out the media segment numbers 8, 9 and 10 corresponding to the content list 4, and at this point, the client requests to send these media segments, store these media segments locally and update the local database. When the user then requests the auxiliary information of the point cloud, the receiving end finds out the content list 6 corresponding to the auxiliary information by checking the DTG information file and finds out the media segment numbers 13 and 14 corresponding to the content list 6, and at this point, the client requests to send these media segments, store these media segments locally and update the local database. After the user obtains all the information, the user may integrate the information in four content lists (content lists 1, 3, 4 and 6) to completely present one point cloud media. Then, when the user needs to perform the dressing operation, the user first finds out a corresponding type list according to the type of the required dressing data, selects a content list from the type list, and then extracts the required media segments according to the media segment numbers in the content list.

It is to be noted that although the point cloud data transmission method is illustrated by using the MMT protocol as an example in this embodiment, the point cloud data of this embodiment may also be transmitted by using other files, such as Dynamic Adaptive Streaming over HTTP (DASH) transmission.

Embodiment Two

In this embodiment, the classification record is formed through a classification flag, and the classification flag represents the correspondence between the media segment and the media version and the data type.

FIG. 4 is a flowchart of the encapsulation of point cloud data according to this embodiment. As shown in FIG. 4, after the compressed point cloud media file is obtained, the method further includes the steps S21 and S22.

Figure 5:
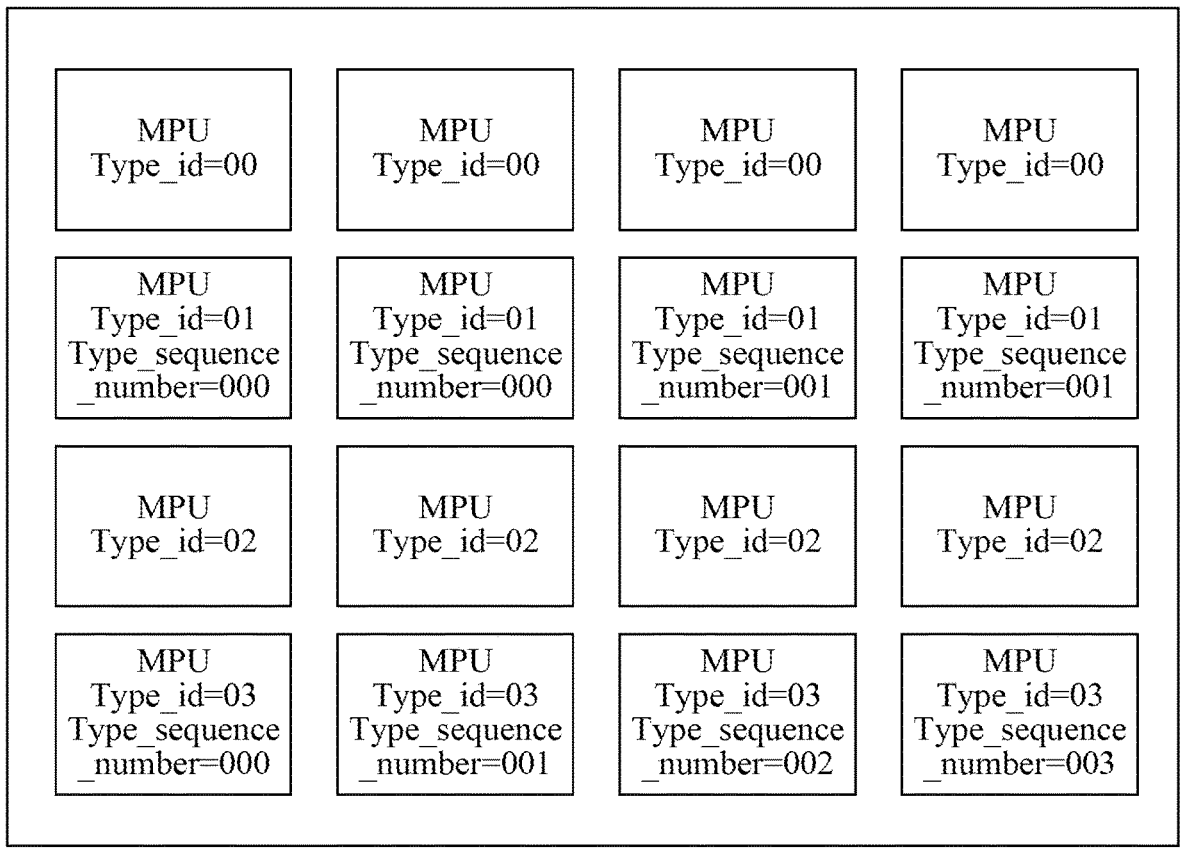
FIG. 5 is a schematic diagram of the addition of flag bits to media segments according to embodiment two of the present disclosure.

In step S21, the compressed point cloud media file is encapsulated as one media asset and may be segmented to obtain a plurality of media segments, for example, 16 media segments shown in FIG. 5.

In step S22, during encapsulation, one classification flag is added to each media segment, and the classification flag records the data type and version information of the media segment.

When different media segments have the same media version and the same data type, the added classification flags are the same. The manner of adding the classification flag is not limited to this embodiment. For example, when the point cloud media file is encapsulated, a reserved field may be used to add the classification flag for the MPU, and subsequently, the user only needs to request a certain type of point cloud data according to the classification flag.

The classification flag typically includes two flag bits, such as type_id and type_sequence_number, as described below. Type_id is used for defining the data type of the media segment, and type_sequence_number is used for defining the version of the media segment. As shown in FIG. 5, the data types of the four MPUs in the first row are all defined as type_id=00; the data types of the four MPUs in the second row are defined as type_id=01; the four data types in the third row are defined as type_id-02; the data type of the four MPUs in the last row are defined as type_id=03. The four values of type_id correspond to four types of data, such as occupancy map information, geometric information, attribute information and ancillary information. The specific manner in which type_id and type_sequence_number are added is not limited to this embodiment.

In an example embodiment, type_id and type_sequence_number may be defined using a reserved field in the MPUBox. For example, 2 bits in the reserved field are defined as type_id, 3 bits in the reserved field are defined as type_sequence_number, and the remaining 1 bit continues to be the reserved field (in the future, if more or fewer types of type_id need to be defined, the field length of type_id may be increased or decreased). In this manner, all MPUs belonging to the same media asset (defined as asset_id) may be divided into different types by using type_id, as shown in Table 3.

TABLE 3

| Modifications made by the present disclosure to the existing MMT definition | |
|---|---|
| Existing MMT definition | MMT definition of the present disclosure |
| aligned(8) class MPUBox extends FullBox('mmpu', version, 0){ unsigned int(1) is_complete; unsigned int(6) reserved; unsigned int(32) mpu_sequence_number; | aligned(8) class MPUBox extends FullBox('mmpu', version, 0){ unsigned int(1) is_complete; unsigned int(2) type_id; unsigned int(3) type_sequence_number; unsigned int(1) reserved; unsigned int(32) mpu_sequence_number; |

As shown in Table 3, the left column is the existing MMT definition, and the right column is the MMT definition of the present disclosure. As can be seen, in the present disclosure, 2 bits are allocated for type_id and 3 bits are allocated for type_sequence_number.

For example, when the character dressing is performed, the occupation map information, the geometric information and the auxiliary information may have only one version, but the corresponding attribute information may have a plurality of versions, so one type_sequence_number may be set for each type_id, and the quantity of type_sequence_number is the number of versions. For example, when one point cloud character has three sets of clothes, the value of type_id is 10, the value of type_sequence_number may be 000, 001 and 010, and the MPUs having the same type_sequence_number correspond to the same set of clothes.

Further, in conjunction with FIG. 5, when the value of type_id is 01, the corresponding data has two versions, and then type_sequence_number has two different values, such as 000 and 001; when the value of type_id is 03, the corresponding data has four versions, and then type_sequence_number has four different values, such as 000, 001, 002 and 003. It is to be understood that for the MPU with type_id=00, no type_sequence_number needs to be defined for the MPU if the data has only one version.

Embodiment Three

In this embodiment, the classification record is also the classification list. Different from embodiment one, the classification list represents the correspondence between the media asset and the data type in the point cloud media file, more specifically, the correspondence between the media asset number and the media asset list.

Figures 6, 7:
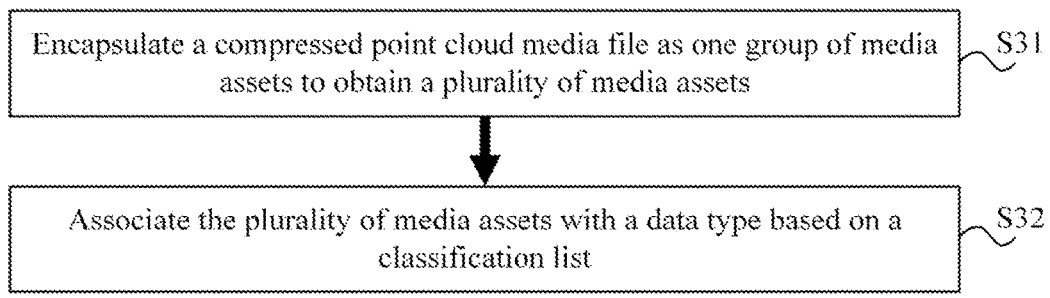
FIG. 6 is a flowchart of the encapsulation of point cloud data according to embodiment three of the present disclosure.
FIG. 7 shows the definition content of an ACR information file according to embodiment three of the present disclosure.

FIG. 6 is a flowchart of the encapsulation of point cloud data according to this embodiment. As shown in FIG. 6, after the compressed point cloud media file is obtained, the method further includes the steps S31 and S32.

In step S31, the compressed point cloud media file is encapsulated as one group of media assets (asset_list) to obtain a plurality of media assets, for example, 16 media assets shown in FIG. 7.

Each media asset has one media asset number, such as media asset numbers 1 to 16, sequentially numbered. It can be seen that each media asset number is different, that is, the media asset is represented by the media asset number.

In step S32, the plurality of media assets is associated with the data type based on the classification list.

As shown in FIG. 7, the classification list includes a media asset list and an asset number list. The media asset list corresponds to the data type of the point cloud media file. The asset number list is a set of all media asset numbers. Each media asset list corresponds to at least one media asset number, and the number of media asset numbers corresponding to each media asset list is consistent with the number of media versions. Each media asset includes at least one media segment whose time period may be several seconds.

For a certain point cloud content, it is assumed that the point cloud content is composed of 16 media assets, and the media asset numbers are 1 to 16 in sequence. It is assumed that the number of media asset lists is 4, and these media asset lists correspond to occupancy map information, geometric information, attribute information and auxiliary information, respectively. As shown in FIG. 7, the occupation map information is the media asset list 1, correspondingly includes 5 versions, and may correspond to media assets whose media asset numbers are 1 to 5; the geometric information is the media asset list 2, correspondingly includes 2 versions, and corresponds to the media assets whose media asset numbers are 6 and 7; the attribute information is the media asset list 3, correspondingly includes 5 versions, and corresponds to media assets whose media asset numbers are 8 to 12; the auxiliary information is the media asset list 4, correspondingly includes 4 versions, and corresponds to media assets whose media asset numbers are 13 to 16. The media asset number is the flag field in the media asset. The point cloud content corresponds to the media assets whose media asset numbers are 1 to 16, respectively, and different point cloud contents correspond to different combinations of media assets. For example, the point cloud content corresponding to the media assets whose media asset numbers are 1, 6, 8 and 13 and the point cloud content corresponding to the media assets whose media asset numbers are 1, 6, 9 and 13 may correspond to images of the same point cloud character in different dress. The point cloud media file includes a plurality of point cloud contents, and a pending flag (pending_flag) is set in the encapsulated point cloud media file, where the pending flag is used for indicating whether media assets of all data types in each point cloud content have been transmitted. When the media assets of all data types of each point cloud content have been prepared, the value of pending_flag is 1; otherwise, the value is 0.

For example, the point cloud content corresponding to the media assets whose media asset numbers are 1, 6, 8 and 13 is transmitted before the point cloud content corresponding to the media assets whose media asset numbers are 1, 6, 9 and 13. Since the two point cloud contents have only one different media asset, only the media asset whose media asset number is 9) needs to be transmitted when the latter point cloud content is transmitted. After the media assets whose media asset numbers are 1, 6, 8 and 13 included in the former point cloud content have been transmitted, the value of pending_flag is 1; after the former point cloud has been transmitted and when the latter point cloud content (only the media asset whose media asset number is 9 needs to be transmitted) is being transmitted, the value of pending_flag becomes 0; after the latter point cloud content (only the media asset whose media asset number is 9 needs to be transmitted) has been transmitted, the value of pending_flag becomes 1.

One pending flag (pending_flag) may be set for each point cloud content to indicate whether media assets of all data types of the point cloud content have been prepared.

Further, in order to transmit and present the point cloud content, in this embodiment, the classification list is defined as an ACR information file, and the ACR information file is written into the signaling information. Similarly, the content defined by the ACR information file is the content corresponding to the classification table of this embodiment and is used for describing the correspondence between the data type of the point cloud media file and the media asset number. One presentable point cloud content corresponds to one media asset list, the media asset list is a set of media asset numbers, and the media asset number is the flag field of the media asset. In this manner, the classification of the point cloud media file may be obtained by reading the ACR information file so that the data that needs to be updated in the current point cloud media file is selectively sent according to the demands of users.

The transmission manner of the ACR information file of this embodiment and the performance of the character dressing operation based on the point cloud media file will be described below in detail according to the above embodiments.

It is assumed that one complete point cloud content needs to search media asset numbers from the media asset lists corresponding to occupation map information, geometric information, attribute information and auxiliary information and then extract corresponding media assets. It is assumed that the media asset lists corresponding to the occupation map information, geometric information, attribute information and auxiliary information are asset_list[0], asset_list[1], asset_list[2] and asset_list[3], respectively, one media asset is extracted from each media asset list, and the media assets are distinguished by media asset numbers. The setting rule is shown in Table 4.

TABLE 4

| Correspondence between the point cloud data and the media asset and the media asset number | | | | |
|---|---|---|---|---|
| asset_list[ ] | 0 | 1 | 2 | 3 |
| asset_id set | 0 | 1 | 2, 4 | 3, 5 |
| Point cloud data type | Occupation map information | Geometric information | Attribute information | Auxiliary information |

The media assets whose media asset numbers (asset_id) are 0 and 1 correspond to the occupation map information and geometric information of the point cloud, respectively, and the media assets whose media asset numbers are 2 and 3 and the media assets whose media asset numbers are 4 and 5 are two sets of attribute information and auxiliary information. Therefore, the media assets whose media asset numbers are 0, 1, 2, 3 and the media assets whose media asset numbers are 0, 1, 4 and 5 may constitute different point cloud contents and are different dress of the same character.

The ACR information file includes important information of different data types of the point cloud, and the important information may be transmitted using different methods, for example, a new signaling unit, signaling file or signaling message is defined or a new descriptor is added or header information of a packet is added. According to the difference of implementation methods, the information described in the ACR information file may be transmitted and used in different manners.

For example, this embodiment provides three transmission manners for the transmission of the ACR information file, but the manner of adding the ACR information file to the signaling information includes, but is not limited to, the following manners.

In manner one, an ACR information file for describing ACR information is added to the signaling information.

In Manner one, the ACR information file is written into the MPI table and transmitted as part of the signaling message, as shown in Table 5.

TABLE 5

Addition of the definition of the ACR Information file to the MPI table

| Grammar | Value | Bit width | Mnemonic |
|---|---|---|---|
| MPI_table ( ) { | | | |
| table_id | | 8 | uimsbf |
| version | | 8 | uimsbf |
| length | N1 | 16 | uimsbf |
| reserved | '1111' | 4 | bslbf |
| PI_mode | | 2 | uimsbf |
| reserved | '11' | 2 | bslbf |
| MPIT_descriptors { | | | |
|   MPIT_descriptors_length | N2 | 16 | uimsbf |
|   for (i=0; i<N2; i++) { | | | |
|     MPIT_descriptors_byte | | 8 | uimsbf |
|   } | | | |
| } | | | |
| PI_content_count | N3 | 8 | uimsbf |
| for (i =0; i<N3; i++) { | | | |
|   PI_content_type { | | | |
|     PI_content_type_length | N4 | 8 | uimsbf |
|     for (j=0; j<N4; j++) { | | | |
|       PI_content_type_length_byte | | 8 | uimsbf |
|     } | | | |
|   } | | | |
|   PI_content_name_length | N5 | 8 | uimsbf |
|   for (j=0; j<N5; j++) { | | | |
|     PI_content_name_byte | | 8 | uimsbf |
|   } | | | |
|   PI_content_descriptors { | | | |
|     PI_content_descriptors_length | N6 | 16 | uimsbf |
|     for (i=0; i<N6; i++) { | | | |
|       PI_contnent_descriptors_byte | | 8 | uimsbf |
|     } | | | |
|   } | | | |
|   PI_content_length | N7 | 16 | uimsbf |
|   for (j=0; j<N7; j++) { | | | |
|     PI_content_byte | | 8 | uimsbf |
|   } | | | |
| } | | | |
| } | | | |

More specifically, the ACR information file is added to the MPI table, the part that needs to be modified is the description part of the PI_content, and the value of PI_content_count is increased by 1; where the PI_content_type field describes the type of ACR information file, and the file format suitable for describing the ACR information may be selected according to the actual situation; the value of PI_content_type_length is the length of the file type; the value of PI_content_type_length_byte is the type of the ACR information file; the value of PI_content_name_length is the length of the name of the ACR information file; the value PI_content_name_byte is the value of the name of the ACR information file; PI_content_descriptores_length and PI_content_descriptors_byte are the length and content of the description information of the ACR information file, respectively, and may be null at present for subsequent expansion; PI_content_length and PI_content_byte are the length and content of the ACR information file, respectively.

According to the above instructions, the ACR information file is written into the MPI table, and then the ACR information may be sent through the signaling information.

In Manner two, a signaling table for describing ACR information is added.

In addition to the manners described above, one new signaling table may be added in the signaling information to specially describe the ACR file information. After a table describing the ACR information is generated and a specific header is added, signaling information describing ACR information may be generated. The signaling information, together with a PA message, an MPI message, an MP message and a CRI message, constitutes new signaling information for transmission. After the new signaling information is received, the receiving end may parse the new signaling information to obtain the media asset list information.

To describe the implementation method proposed by the present disclosure more clearly, one specific implementation process is described according to Manner one.

When the receiving end logs in to the service, the sending end sends signaling information. After the user obtains the media asset list (asset_list) in the ACR information file, the user may know the media asset numbers (asset_id) corresponding to the occupancy map information, geometry information, attribute information and auxiliary information from asset_list[0], asset_list[1], asset_list[2] and asset_list [3]. When the occupancy map information of the point cloud is requested from the sending end, the receiving end finds out by checking the DTG information file that the corresponding asset_id of the occupancy graph in the asset_list[0] is 0. When the user then requests the geometry information, the corresponding media assets are obtained from the sending end by checking the DTG information file and the local database, where these media assets are the media assets corresponding to a certain asset_id included in the asset_list [1]. When the user then requests the attribute, the corresponding media assets are obtained from the sending end by checking the DTG information file and the local database, where these media assets are the media assets corresponding to an asset_id included in the asset_list[2]. When the user then requests the auxiliary information, the corresponding media assets are obtained from the sending end by checking the DTG information file and the local database, where these media assets are the media assets corresponding to an asset_id included in the asset_list[3]. After the user obtains all the information, the user may integrate the information in four kinds of obtained media assets to completely present one point cloud media. When the user needs to perform the dressing operation, the user only needs to request the corresponding media assets in asset_list[2] and asset_list[3] again.

It is to be noted that although the point cloud data transmission method is illustrated by using the MMT protocol as an example in this embodiment, the point cloud data of this embodiment may also be transmitted by using other files, such as DASH transmission.

The specific embodiments of the present disclosure have been described above. It is to be understood that the present disclosure is not limited to the specific embodiments described above, and various variations or modifications can be made by those skilled in the art within the scope of the appended claims and do not affect the present disclosure materially. If not in collision, the embodiments described herein and the features thereof can be combined with each other.

What is claimed is:

1. A point cloud media resource encapsulation method, comprising:
   compressing a point cloud media file;
   encapsulating the compressed point cloud media file as a group of media assets and segmenting the group of media assets to obtain a plurality of media assets; and
   associating the plurality of media assets with a plurality of data type in the point cloud media file based on a classification list;
   wherein the classification list is used for indicating correspondences between the plurality of media assets and the plurality of data type; the compressed point cloud media file comprises a plurality of point cloud contents, different point cloud contents correspond to different combinations of media asserts;
   wherein the method further comprises: setting a pending flag for each point cloud content, wherein the pending flag is used for indicating whether all media assets in each point cloud content are ready for rendering.

2. The method according to claim 1, wherein
   each of the plurality of media assets has a respective media asset number; the classification list comprises a plurality of media asset lists and an asset number list;
   the plurality of media asset lists correspond to a plurality of data types of the group of media assets;
   the asset number list is a set of all media asset numbers of the plurality of media assets.

3. The method according to claim 1, wherein,
   the plurality of data types comprises at least one of occupation map information, geometric information, attribute information, and auxiliary information;
   each data type corresponds to at least one media assets of the plurality of media assets; and
   the classification list comprises correspondences between the plurality of data types and the plurality of media assets.

4. The method according to claim 2, wherein,
   each media asset list corresponds to at least one media asset number, and a quantity of the at least one media asset numbers corresponding to each media asset list is consistent with a number of media versions, wherein each media version is one application scenario.

5. The method according to claim 1, further comprising:
   setting a value of a pending flag of one point cloud content as 1 in a case where all media assets in the one point cloud content are ready for rendering; or
   setting a value of a pending flag of one point cloud content as 0 in a case where all media assets in the one point cloud content are not ready for rendering.

6. A point cloud data transmission method, comprising:
   adding a related content of a classification list to signaling information, wherein the classification list is used for indicating correspondences between a plurality of data types in a compressed point cloud media file and a plurality of media assets in the compressed point cloud media file, wherein the compressed point media file comprises a plurality of point cloud contents; and
   transmitting local data that needs to be updated of a first point cloud content in the compressed point cloud media file according to the classification list;
   wherein before transmitting the local data that needs to be updated of the first cloud content in the compressed point cloud media file, the method further comprises:
   transmitting all data of a second point cloud content in the compressed point cloud media file, wherein the local data that needs to be updated of the first point cloud content is different from the all data of the second point cloud content.

7. The method according to claim 6, wherein,
   different point cloud contents correspond to different combinations of media assets; and
   the method further comprises:
   setting a pending flag for each of the plurality of point cloud contents in the encapsulated point cloud media file, wherein the pending flag is used for indicating whether all media assets in each of the plurality of point cloud contents are ready for rendering.

8. The method according to claim 6, further comprising:
   compressing a point cloud media file to obtain the compressed point cloud media file,
   encapsulating the compressed point cloud media file and setting the classification list according to the plurality of data types.

9. The method according to claim 8, wherein encapsulating the compressed point cloud media file and setting the classification record according to the plurality of data types comprises:
   encapsulating the compressed point cloud media file as a group of media assets, segmenting the group of media assets to obtain the plurality of media assets; and
   associating the plurality of media assets with the plurality of data types in the compressed point cloud media file based on the classification list.

10. The method according to claim 9, wherein
    the plurality of media assets have different media asset numbers; the classification list comprises a plurality of media asset lists and an asset number list;
    the plurality of media asset lists correspond to a plurality of data types of the group of media assets;
    the asset number list is a set of all media asset numbers of the plurality of media assets.

11. The method according to claim 10, wherein
    each media asset list corresponds to at least one media asset number, and a quantity of the at least one media asset numbers corresponding to each media asset list is consistent with a number of media versions, wherein each media version is one application scenario.

12. The method according to claim 7, further comprising:
    setting a value of a pending flag of one point cloud content as 1 in a case where all media assets in the one point cloud content are ready for rendering; or
    setting a value of a pending flag of one point cloud content as 0 in a case where a transmission of all media assets in the one point cloud content are not ready for rendering.

* * * * *